United States Patent
Imade

(10) Patent No.: US 8,719,821 B2
(45) Date of Patent: May 6, 2014

(54) PROCESS ALLOCATION APPARATUS AND PROCESS ALLOCATION METHOD

(75) Inventor: Hiroaki Imade, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/415,255

(22) Filed: Mar. 8, 2012

(65) Prior Publication Data
US 2012/0304180 A1 Nov. 29, 2012

(30) Foreign Application Priority Data

May 23, 2011 (JP) ................. 2011-115232

(51) Int. Cl.
*G06F 9/46* (2006.01)
*G06F 15/16* (2006.01)
*G06F 15/173* (2006.01)

(52) U.S. Cl.
USPC ........... 718/100; 718/104; 709/201; 709/223; 709/224; 709/225; 709/226

(58) Field of Classification Search
None
See application file for complete search history.

(56) References Cited

U.S. PATENT DOCUMENTS

| | | | |
|---|---|---|---|
| 2002/0042274 A1* | 4/2002 | Ades | ............................. 455/445 |
| 2006/0101104 A1 | 5/2006 | Bhanot et al. | |
| 2007/0260668 A1 | 11/2007 | Chen et al. | |
| 2010/0153965 A1 | 6/2010 | Arimilli et al. | |

FOREIGN PATENT DOCUMENTS

| | | |
|---|---|---|
| JP | 2008-516346 | 5/2008 |
| WO | WO-2006/044258 A1 | 4/2006 |

OTHER PUBLICATIONS

EESR, Extended European Search Report of EP Patent Application 12159122.6 mailed Mar. 20, 2014.

* cited by examiner

*Primary Examiner* — Emerson Puente
*Assistant Examiner* — Adam Lee
(74) *Attorney, Agent, or Firm* — Fujitsu Patent Center

(57) ABSTRACT

A process allocation apparatus includes an evaluation value calculating unit, an internode total communication traffic calculating unit, and a correction evaluation value calculating unit. The evaluation value calculating unit calculates an evaluation value of process allocation in accordance with a hop count and inter-process communication traffic from a communication source node to which a process used as a communication source is allocated to a communication destination node to which a process used as a communication destination is allocated. The internode total communication traffic calculating unit specifies a communication route from the communication source node to the communication destination node and calculates internode total communication traffic indicating that the communication traffic between nodes on the specified communication route. The correction evaluation value calculating unit calculates a correction evaluation value used for the correction in accordance with the calculated evaluation value of the process allocation and the calculated internode total communication traffic.

3 Claims, 8 Drawing Sheets

NODE

PROCESS

| PROCESS ID | NODE ID | X COORDINATE | Y COORDINATE |
|---|---|---|---|
| 0 | 14 | 1 | 1 |
| 1 | 17 | 1 | 2 |
| 2 | 15 | 2 | 1 |
| 3 | 11 | 1 | 0 |
| 4 | 12 | 2 | 0 |
| 5 | 16 | 0 | 2 |
| 6 | 10 | 0 | 0 |
| 7 | 13 | 0 | 1 |
| 8 | 18 | 2 | 2 |

FIG.4

| COMMUNICATION SOURCE PROCESS ID | COMMUNICATION DESTINATION PROCESS ID | INTER-PROCESS COMMUNICATION TRAFFIC [BYTE] |
|---|---|---|
| 0 | 2 | 904 |
| 0 | 3 | 64 |
| 1 | 3 | 128 |
| 1 | 8 | 64 |
| 2 | 6 | 128 |
| 3 | 6 | 32 |
| 4 | 0 | 128 |
| 5 | 1 | 904 |
| 7 | 3 | 32 |
| 7 | 4 | 128 |
| 7 | 5 | 256 |
| 8 | 6 | 128 |

FIG.5

| COMMUNICATION SOURCE PROCESS ID | COMMUNICATION DESTINATION PROCESS ID | EVALUATION VALUE |
|---|---|---|
| 0 | 1 | 0 |
| 0 | 2 | 904 |
| 0 | 3 | 64 |
| 0 | 4 | 0 |
| ⋮ | ⋮ | ⋮ |

FIG.6

| NODE ID TO WHICH COMMUNICATION SOURCE PROCESS IS ALLOCATED | NODE ID TO WHICH COMMUNICATION DESTINATION PROCESS IS ALLOCATED | INTERNODE TOTAL COMMUNICATION TRAFFIC [BYTE] |
|---|---|---|
| ⋮ | ⋮ | ⋮ |
| 14 | 11 | 448 |
| 14 | 13 | 0 |
| 14 | 15 | 0 |
| 14 | 17 | 256 |
| ⋮ | ⋮ | ⋮ |

FIG.7

| PROCESS ALLOCATION ID | CORRECTION EVALUATION VALUE |
|---|---|
| xxx1 | 3012 |
| xxx2 | 740 |
| ⋮ | ⋮ |

| COMMUNICATION SOURCE PROCESS | COMMUNICATION DESTINATION PROCESS |
|---|---|
| 0 | 2, 3, 4 |
| 1 | 3, 5, 8 |
| 2 | 0, 6 |
| 3 | 0, 1, 6, 7 |
| 4 | 0, 7 |
| 5 | 1, 7 |
| 6 | 2, 3, 8 |
| 7 | 3, 4, 5 |
| 8 | 1, 6 |

PROCESS ALLOCATION APPARATUS AND PROCESS ALLOCATION METHOD

CROSS-REFERENCE TO RELATED APPLICATION

This application is based upon and claims the benefit of priority of the prior Japanese Patent Application No. 2011-115232, filed on May 23, 2011, the entire contents of which are incorporated herein by reference.

FIELD

The embodiments discussed herein are directed to a process allocation apparatus, a process allocation method, and a process allocation program.

BACKGROUND

In conventional computer systems that have a plurality of information processing apparatuses (hereinafter, referred to as nodes), parallel programs are executed by a process allocated to a node communicating with a process allocated to another node.

If a node to which a communication destination process is allocated is different from a node to which a communication source process is allocated, the nodes through which the process passes at the time of communication differ and the communication hop count, which indicates the number of nodes passed through, also differ. Accordingly, communication processing time between processes is affected by the location of the node to which a process is allocated.

The relation between the locations of nodes to which processes are allocated and the communication processing time will be described with reference to FIGS. 10A to 10C. FIG. 10A is a schematic diagram illustrating a process that is used as a communication destination with respect to a communication source process. FIGS. 10B and 10C are schematic diagrams each illustrating an example of a process allocation.

In the example illustrated in FIG. 10B, each process is allocated such that the communication hop count is "1". In other words, each process communicates with a process that is allocated to a node adjacent to that process. In such a case, because each node only communicates with an adjacent node, the path between each node and the adjacent node is not used for communication with other processes. If processes are allocated in this way, the communication processing time is reduced.

In contrast, in the example illustrated in FIG. 10C, processes are allocated such that the communication hop count is "2" or more. Specifically, if a process 6 communicates with a process 2, the process 6 passes through four nodes, i.e., a node 903, a node 900, a node 901, and a node 902. Accordingly the communication hop count is "4". Furthermore, a path between a node 906 and the node 903 through which the process 6 communicates with the process 2 is also used for communication between the process 6 and a process 3. Accordingly, in the process allocation illustrated in FIG. 10C, the number of nodes to be passed through for a single communication is large and nodes are used for multiple communication, thereby the communication processing time is longer when compared with a case in which processes are allocated like that illustrated in FIG. 10B.

As described above, in a computer system, to reduce the communication processing time, the allocation of processes to nodes is optimized. For example, the computer system measures the communication processing time of the processes allocated to the nodes and evaluates the process allocation. Furthermore, in order to save trouble of measurement of the communication processing time needed each time, the computer system calculates an evaluation value of the process allocation and then evaluates the process allocations relative to each other on the basis of the calculated value.

For example, the computer system uses Equation (A) below to evaluate the process allocations relative to each other:

$$F = \sum_{i,j \in \text{ALL PROCESSES}} \{\text{hop}(\text{node}(i), \text{node}(j)) \times \text{size}(i, j)\} \quad (A)$$

In Equation (A), {hop(node(i), node(j))} represents the communication hop count between a communication source process (a process executed by a node (i)) and a communication destination process (a process executed by a node (j)), whereas size (i, j) represents the communication traffic between the communication source process and the communication destination process. Specifically, an evaluation value of F indicates the sum of the values obtained by multiplying the communication hop count by the communication traffic of all of the combinations of the communication source processes and the communication destination processes. According to Equation (A), the evaluation value F becomes small in accordance with the allocation in which communication hop count is reduced for processes that perform a large amount of communication. Accordingly, the computer system calculates a value using Equation (A) and allocates a process such that the calculated value is smaller than a predetermined threshold.

Patent Document 1: Japanese National Publication of International Patent Application No. 2008-516346

However, in the conventional technology, there is a problem in that the process allocation is not accurately evaluated.

For example, in the conventional technology, the communication processing time is reduced by allocating processes such that the communication hop count is reduced as the communication volume of the process increases. The problem is that, in the conventional technology, the communication traffic between processes is taken into consideration, but the communication traffic between nodes is not taken into consideration. Accordingly, there may be a case in which processes are allocated such that, even if the communication hop count is small, communication is concentrated on specific nodes. If processes are allocated in this way, the communication processing time increases.

SUMMARY

According to an aspect of an embodiment of the invention, a process allocation apparatus for allocating processes to multiple nodes connected with each other. The process allocation apparatus includes a process allocation storing unit that stores location information on the multiple nodes and identifiers of the processes allocated to the multiple nodes in an associated manner, an inter-process communication traffic storing unit that stores identifiers of the process used as a communication source, identifiers of the process used as a communication destination, and inter-process communication traffic that indicates communication traffic between the process used as the communication source and the process used as the communication destination in an associated manner, an evaluation value calculating unit that specifies a hop count from a communication source node to which a process used as the communication source is allocated to a communication destination node to which a process used as the communication destination is allocated from the process allocation storing unit, acquires the inter-process communication traffic from the inter-process communication traffic storing unit, and calculates an evaluation value of process allocation in accordance with the hop count and the inter-process communication traffic, an internode total communication traffic calculating unit that specifies a communication route from the communication source node to the communication destination node, that acquires inter-process communication traffic between processes allocated to nodes on the specified communication route from the inter-process communication traffic storing unit, and calculates internode total communication traffic that indicates a sum of the communication traffic between the nodes from the acquired inter-process communication traffic, a correction evaluation value calculating unit that calculates a correction evaluation value used for correction in accordance with the calculated evaluation value of the process allocation and the calculated internode total communication traffic calculated; and a process allocation unit that relocates processes to the multiple nodes when the calculated correction evaluation value is below a predetermined value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a schematic diagram illustrating an example of an inter-process communication traffic table;

FIG. 5 is a schematic diagram illustrating an example of an evaluation value table;

FIG. 6 is a schematic diagram illustrating an example of an internode total communication traffic table;

FIG. 7 is a schematic diagram illustrating an example of a correction evaluation value table;

DESCRIPTION OF EMBODIMENTS

Preferred embodiments of the present invention will be explained with reference to accompanying drawings. The present invention is not limited to these embodiments. Furthermore, the embodiments can be appropriately used in combination as long as processes do not contradict.

[a] First Embodiment

In a first embodiment, an example configuration of a computer system according to the first embodiment, the configuration of the process allocation apparatus according to the first embodiment, the flow of a process performed by the process allocation apparatus, and an advantage of the first embodiment will be described with reference to FIGS. 1 to 8 in the order they are listed in this sentence.

Example Configuration of a Computer System According to the First Embodiment

Figure 1:
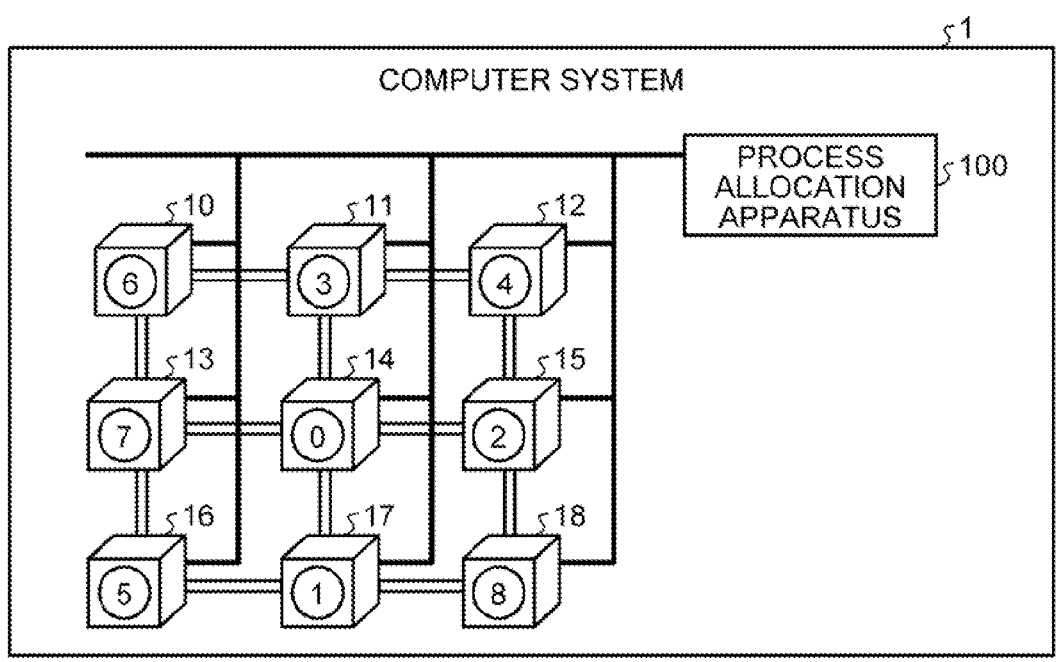
FIG. 1 is a schematic diagram illustrating an example configuration of a computer system.
Figure 1:
Figure 1:

FIG. 1 is a schematic diagram illustrating an example configuration of a computer system. As illustrated in FIG. 1, a computer system 1 includes nodes 10 to 18 and a process allocation apparatus 100. Each of the nodes 10 to 18 is connected to each of the adjacent nodes 10 to 18 in a mesh form and can communicate with each other. Furthermore, each process is allocated to each of the nodes 10 to 18 and executes a parallel program by communicating with a process allocated to another node from among the nodes 10 to 18. The process allocation apparatus 100 is connected to each node such that they can communicate with each other via, for example, a local area network (LAN). The configuration of the connection between each node and the adjacent node in the computer system 1 is not limited to a mesh form. For example, they are connected in a torus form or in a loop form.

The node 10 is an information processing apparatus that includes a central processing unit (CPU) and a memory and executes a process "6" that is allocated by the process allocation apparatus 100. The operation executed by the nodes 11 to 18 is the same as that performed by the node 10; therefore, a description thereof will be omitted here.

The process allocation apparatus 100 allocates a process to each node. Then, the process allocation apparatus 100 determines whether the allocation of the process is optimized. For example, the process allocation apparatus 100 calculates an evaluation value used to evaluate the allocation of the process relative to each other and determines whether the calculated evaluation value is below a predetermined threshold.

If the process allocation apparatus 100 determines that the calculated evaluation value is not below the predetermined threshold, the process allocation apparatus 100 allocates a new process to each node and calculates an evaluation value. In contrast, if the process allocation apparatus 100 determines that the calculated evaluation value is below the predetermined threshold, the process allocation apparatus 100 determines that the process allocation is optimized.

Figures 2, 3:
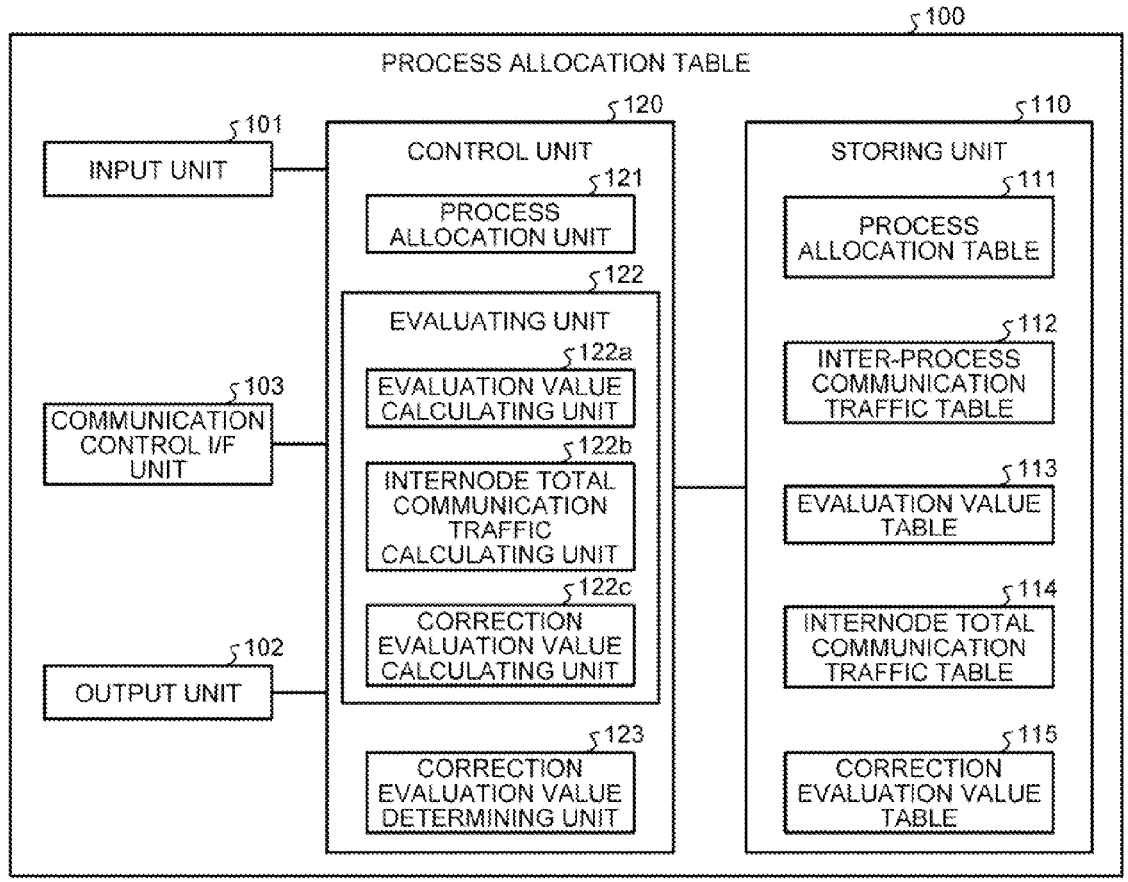
FIG. 2 is a block diagram illustrating the configuration of a process allocation apparatus.
FIG. 3 is a schematic diagram illustrating an example of a process allocation table.

Configuration of the Process Allocation Apparatus According to the First Embodiment In the following, the configuration of the process allocation apparatus 100 according to the first embodiment will be described with reference to FIG. 2. FIG. 2 is a block diagram illustrating the configuration of a process allocation apparatus. The process allocation apparatus 100 according to the first embodiment includes an input unit 101, an output unit 102, a communication control I/F unit 103, a storing unit 110, and a control unit 120.

The input unit 101 is, for example, a keyboard or a mouse and receives an input, from a user, of various settings or operations. The output unit 102 is, for example, a display and outputs various kinds of information.

The communication control I/F unit 103 is an interface that includes at least one communication port and controls various kinds of information exchanged with other devices including nodes. For example, the communication control I/F unit 103 allocates a process to each node.

The storing unit 110 is a storage device, such as a semiconductor memory device and includes a process allocation table 111, an inter-process communication traffic table 112, an evaluation value table 113, an internode total communication traffic table 114, and a correction evaluation value table 115.

The process allocation table 111 stores therein, in an associated manner, location information on the nodes connected in a mesh or a torus form and identifiers of the processes allocated to the nodes. An example of the process allocation table 111 will be described with reference to FIG. 3. FIG. 3 is a schematic diagram illustrating an example of a process allocation table. As illustrated in FIG. 3, for example, the process allocation table 111 stores therein, in an associated manner, a "process ID", a "node ID", the "X coordinate", and the "Y coordinate".

Here, the "process ID" stored in the process allocation table 111 indicates an identifier of a process. For example, "0", "1", or "2" is stored in the "process ID". The "node ID" indicates an identifier of a node. For example, "14", "17", or "15" is stored in the "node ID". For convenience of description, a description will be given with the assumption that the values stored in the "process ID" are associated with the numbers assigned to the processes illustrated in FIG. 1 and that the values stored in the "node ID" are associated with the numbers assigned to the nodes illustrated in FIG. 1.

The "X coordinate" indicates the X coordinate when location information on each node is represented using the two-dimensional coordinates. For example, "0", "1", or "2" is stored in the "X coordinate". The "Y coordinate" indicates the Y coordinate when location information on each node is represented using the two-dimensional coordinates. For example, "0", "1", or "2" is stored in the "Y coordinate". In the following, a description will be given with the assumption that the "X coordinate" and the "Y coordinate" are represented by the two-dimensional coordinates in which the node 10 illustrated in FIG. 1 is set to the origin (0,0).

Furthermore, the "node ID", the "X coordinate", and the "Y coordinate" in the process allocation table 111 stores therein values that are previously set by a user. Furthermore, the "process ID" stored in the process allocation table 111 is stored by a process allocation unit 121, which will be described later.

Specifically, in the example illustrated in FIG. 3, the process allocation table 111 indicates that the process identified by an ID of "0" is allocated to the node 14 that is located to the coordinates (1, 1) and indicates that the process identified by an ID of "1" is allocated to the node 17 that is located to the coordinates (1, 2). Similarly, the process allocation table 111 indicates that the process identified by an ID of "2" is allocated to the node 15 that is located to the coordinates (2, 1) and indicates that the process identified by an ID of "3" is allocated to the node 11 that is located to the coordinates (1,0).

The inter-process communication traffic table 112 stores therein, in an associated manner, an identifier of a process that corresponds to a communication source, an identifier of a process that corresponds to a communication destination, and inter-process communication traffic that indicates the communication traffic between the process corresponding to the communication source and the process corresponding to the communication destination. An example of the inter-process communication traffic table 112 will be described with reference to FIG. 4. FIG. 4 is a schematic diagram illustrating an example of an inter-process communication traffic table. As illustrated in FIG. 4, for example, the inter-process communication traffic table 112 stores therein, in an associated manner, a "communication source process ID", a "communication destination process ID", and "inter-process communication traffic (byte)".

Here, the "communication source process ID" stored in the inter-process communication traffic table 112 indicates an identifier of a process that functions as the communication source and stores therein, for example, "0", "1", or "2". The "communication destination process ID" indicates an identifier of a process that functions as the communication destination and stores therein, for example, "2", "3", or "8". The "inter-process communication traffic (Byte)" indicates the communication traffic of the communication established between the communication source process and the communication destination process and stores therein, for example, "904", "64", or "128".

Specifically, in the example illustrated in FIG. 4, the inter-process communication traffic table 112 indicates that the communication traffic between the process, which is identified by an ID of "0" and is used as the communication source, and the process, which is identified by an ID of "2" and is used as the communication destination, is "904 (bytes)". Similarly, the inter-process communication traffic table 112 indicates that the communication traffic between the process, which is identified by an ID of "0" and is used as the communication source, and the process, which is identified by the ID of "3" and is used as the communication destination, is "64 (bytes)".

The evaluation value table 113 stores therein evaluation values of process allocation between the communication source process and the communication destination process. An example of the evaluation value table 113 will be described with reference to FIG. 5. FIG. 5 is a schematic diagram illustrating an example of an evaluation value table. As illustrated in FIG. 5, for example, the evaluation value table 113 stores therein, in an associated manner, the "communication source process ID", the "communication destination process ID", and the "evaluation value".

The "communication source process ID" and the "communication destination process ID" stored in the evaluation value table 113 are the same as those described in the inter-process communication traffic table 112; therefore, a description thereof will be omitted here. The "evaluation value" is a value used to evaluate the process allocations relative to each other between the communication source process and the communication destination process. For example, "0", "904", or "64" is stored in the "evaluation value". The value stored in the "evaluation value" is calculated by an evaluation value calculating unit 122a, which will be described later.

Specifically, in the example illustrated in FIG. 5, the evaluation value table 113 indicates that the evaluation value of the process allocation is "0", in which the process identified by the ID of "0" is used as the communication source and the process identified by the ID of "1" is used as the communication destination. Similarly, the evaluation value table 113 indicates that the evaluation value of the process allocation is "904", in which the process identified by the ID of "0" is used as the communication source and the process identified by the ID of "2" is used as the communication destination.

The internode total communication traffic table 114 stores therein the sum of the communication traffic, related to a certain process allocation, between nodes to which processes are allocated. An example of the internode total communication traffic table 114 will be described with reference to FIG. 6. FIG. 6 is a schematic diagram illustrating an example of an internode total communication traffic table. As illustrated in FIG. 6, for example, the internode total communication traffic table 114 stores therein, in an associated manner, an "ID of a node to which a communication source process is allocated", an "ID of a node to which a communication destination process is allocated", and "internode total communication traffic (bytes)".

The "ID of the node to which the communication source process is allocated" stored in the internode total communication traffic table 114 indicates an identifier of a node to which a process that is used as the communication source is allocated and stores therein, for example, "14". The "ID of the node to which the communication destination process is allocated" indicates an identifier of a node to which a process that is used as the communication destination is allocated and stores therein, for example, "11", "13", or "15". The "internode total communication traffic (bytes)" indicates the sum of the communication traffic between a node of a process and an adjacent node thereof and stores therein, for example, "448", "0", or "256".

Specifically, in the example illustrated in FIG. 6, the internode total communication traffic table 114 indicates that the sum of the communication traffic between the node 14 and the node 11 is "448 (bytes)" and the sum of the communication traffic between the node 14 and the node 13 is "0 (bytes)".

The correction evaluation value table 115 stores therein an evaluation value used to evaluate the allocation of processes relative to each other in a certain process allocation. An example of the correction evaluation value table 115 will be described with reference to FIG. 7. FIG. 7 is a schematic diagram illustrating an example of a correction evaluation value table. As illustrated in FIG. 7, for example, the correction evaluation value table 115 stores therein, in an associated manner, a "process allocation ID" and a "correction evaluation value".

The "process allocation ID" stored in the correction evaluation value table 115 indicates an identifier for identifying the combinations of the processes including the communication source process and the communication destination process that are allocated to nodes. For example, "xxx1", "xxx2", or the like are stored therein. The "correction evaluation value" is a value used to evaluate the allocation of processes relative to each other. For example, the "correction evaluation value" stores therein "3012", "740", or the like.

Specifically, in the example illustrated in FIG. 7, the correction evaluation value table 115 indicates that the evaluation value of the process allocation identified by the ID of "xxx1" is "3012". similarly, the correction evaluation value table 115 indicates that the evaluation value of the process allocation identified by the ID of "xxx2" is "740". The value that is stored as the "correction evaluation value" is calculated by a correction evaluation value calculating unit 122c, which will be described later.

The control unit 120 includes an internal memory for storing data and programs prescribing various kinds of procedures. The control unit 120 includes the process allocation unit 121, an evaluating unit 122, a correction evaluation value determining unit 123. For example, the control unit 120 is implemented by using an integrated circuit, such as an application specific integrated circuit (ASIC) or a field programmable gate array (FPGA), or an electronic circuit, such as a central processing unit (CPU) or a micro processing unit (MPU).

The process allocation unit 121 allocates processes to nodes that are connected in a mesh or a torus manner and stores, in an associated manner in the process allocation table 111, the identifiers of the allocated processes and the location information on the nodes.

For example, if the process allocation unit 121 allocates the process 2 to the node 15 that is allocated at the coordinates (2, 1), the process allocation unit 121 performs the following process. Namely, the process allocation unit 121 stores "2" in the "process ID" in which the "node ID" of "15", the "X coordinate" of "2", and the "Y coordinate" of "1" are associated with each other in the process allocation table 111 illustrated in FIG. 3.

Furthermore, if the process allocation unit 121 allocates a process to a node, the process allocation unit 121 adds an identifier to the combination of the allocated process. Specifically, the process allocation unit 121 adds a process allocation ID to the combination of the process allocation indicated by the process allocation table 111.

The evaluating unit 122 includes the evaluation value calculating unit 122a, an internode total communication traffic calculating unit 122b, and the correction evaluation value calculating unit 122c and evaluates the allocation of a process that is allocated to a node by the process allocation unit 121.

In accordance with the communication hop count and the inter-process communication traffic, the evaluation value calculating unit 122a calculates an evaluation value between the communication source process and the communication destination process. The communication hop count indicates the number of nodes through which a process passes when communication is performed from the communication source node, to which a process that is used as the communication source is allocated, to the communication destination node, to which a process that is used as the communication destination is allocated. The communication hop count is specified using the process allocation table 111. Furthermore, the inter-process communication traffic is obtained from the inter-process communication traffic table 112.

For example, the evaluation value calculating unit 122a calculates, by performing the following process, the evaluation value of the allocation of processes between the communication source process identified by the ID of "0" and the communication destination process identified by the ID of "2". It is assumed that the processes are allocated in a manner indicated by the process allocation table 111 illustrated in FIG. 3 and that the communication traffic between the processes is like that indicated by the inter-process communication traffic table 112 illustrated in FIG. 4.

The evaluation value calculating unit 122a specifies, from the process allocation table 111, the node 14 to which the communication source process identified by the ID of "0" is allocated and the node 15 to which the communication destination process identified by the ID of "2" is allocated. Subsequently, the evaluation value calculating unit 122a specifies "1" as the communication hop count for the communication performed from the node 14 to the node 15. Specifically, the evaluation value calculating unit 122a calculates, from the coordinates (1, 1) of the node 14, the difference (−1,0) of the coordinates (2, 1) of the node 15 and specifies "1" as the communication hop count, which is the sum of the calculated X-coordinate absolute value of "1" and the calculated Y-coordinate absolute value of "0".

Furthermore, the evaluation value calculating unit 122a acquires, from the inter-process communication traffic table 112, the "904 (bytes)" that is the inter-process communication traffic between the communication source process identified by the ID of "0" and the communication destination process identified by the ID of "2".

Then, the evaluation value calculating unit 122a calculates a value, as an evaluation value, by multiplying the specified communication hop count by the acquired inter-process communication traffic. For example, the evaluation value calculating unit 122a multiplies the communication hop count of "1" by the inter-process communication traffic "904 (bytes)" to calculate the evaluation value of "904".

Furthermore, as another example, a case of calculating an evaluation value of the allocation of processes between the communication source process identified by the ID of "2" and the communication destination process identified by the ID of "6" will be described. The evaluation value calculating unit 122a specifies, from the process allocation table 111, the node 15 to which the communication source process "2" is allocated and the node 10 to which the communication destination process "6" is allocated. Then, the evaluation value calculating unit 122a specifies "3" as the communication hop count for the communication performed from the node 15 to the node 10.

Furthermore, the evaluation value calculating unit 122a acquires, from the inter-process communication traffic table 112, the inter-process communication traffic "128 (bytes)" of the communication established between the communication source process "2" and the communication destination process "6". Then, the evaluation value calculating unit 122a calculates the evaluation value "384" by multiplying the communication hop count "3" by the inter-process communication traffic "128 (bytes)".

The internode total communication traffic calculating unit 122b calculates the internode total communication traffic that indicates the sum of the communication traffic between nodes. For example, the internode total communication traffic calculating unit 122b specifies a communication route from the node, to which the communication source process is allocated, to the node, to which the communication destination process is allocated. Furthermore, the internode total communication traffic calculating unit 122b acquires the communication traffic between processes from the inter-process communication traffic table 112. Then, the internode total communication traffic calculating unit 122b adds the acquired inter-process communication traffic between nodes on the specified communication route. Furthermore, the internode total communication traffic calculating unit 122b performs the same process on all of the communication performed between the processes and calculates the internode total communication traffic that indicates the sum of the communication traffic of each of the nodes.

For example, if the processes are allocated on the basis of the process allocation table 111 illustrated in FIG. 3, the internode total communication traffic calculating unit 122b calculates the sum of the node 14, to which the process "0" is allocated, and the node 11, to which the process "3" is allocated by performing the following process. For convenience of description, a description will be given with the assumption that the node 14 and the node 11 are used for the communication between the process "0" and the process "3", between the process "0" and the process "4", between the process "1" and the process "3", and between the process "2" and the process "6".

The internode total communication traffic calculating unit 122b acquires, from the inter-process communication traffic table 112 illustrated in FIG. 4, the state in which the communication traffic between the process "0" and the process "3" is "64 (bytes)" and the state in which the communication traffic between the process "0" and the process "4" is "128 (bytes)". Similarly, the internode total communication traffic calculating unit 122b acquires the state in which the communication traffic between the process "1" and the process "3" is "128 (bytes)" and also acquires the state in which the process "2" and the process "6" is "128 (bytes)". Then, the internode total communication traffic calculating unit 122b calculates the total sum of the communication traffic between the nodes by summing the communication traffic between the acquired processes. For example, the internode total communication traffic calculating unit 122b calculates "64+128+128+128=448 (bytes)" as the total sum of the communication traffic between the node 14 and the node 11.

The correction evaluation value calculating unit 122c calculates a correction evaluation value in accordance with the evaluation value calculated by the evaluation value calculating unit 122a and the internode total communication traffic calculated by the internode total communication traffic calculating unit 122b.

For example, the correction evaluation value calculating unit 122c calculates the correction evaluation value in accordance with Equation (B) below:

$$F = \sum_{i,j \in ALL\ PROCESSES} \{hop(node(i), node(j)) \times size(i, j)\} \times max(DB) \quad (B)$$

In Equation (B), {hop(node(i), node(j))} represents the communication hop count between the communication source process (a process executed by a (node(i)) and the communication destination process (a process executed by a node(j)) and size(i, j) represents the communication traffic between the communication source process and the communication destination process. Furthermore, max (DB) represents the maximum value of the internode total communication traffic.

Specifically, the correction evaluation value calculating unit 122c calculates the total sum of the evaluation values; extracts the maximum value of the internode total communication traffic; and calculates the correction evaluation value in accordance with the calculated total sum of the evaluation value and the extracted maximum value of the internode total communication traffic.

More specifically, the correction evaluation value calculating unit 122c reads, from the evaluation value table 113, the evaluation values of all of the combinations of the communication source processes and the communication destination process and calculate the total sum of the read evaluation values. Furthermore, the correction evaluation value calculating unit 122c extracts, from the internode total communication traffic table 114, the maximum value of the internode total communication traffic.

Then, the correction evaluation value calculating unit 122c calculates a value, as a correction evaluation value, obtained by multiplying the sum of the evaluation values by the maximum value of the internode total communication traffic. Subsequently, the correction evaluation value calculating unit 122c stores the calculated correction evaluation value in the "correction evaluation value" in the correction evaluation value table 115 in association with the "process allocation ID".

The correction evaluation value determining unit 123 determines whether the correction evaluation value calculated by the correction evaluation value calculating unit 122c is below a predetermined threshold. Then, if the correction evaluation value determining unit 123 determines that the correction evaluation value is below the predetermined threshold, the correction evaluation value determining unit 123 determines that the process allocation is optimized. In such a case, the correction evaluation value determining unit 123 may also output, to the output unit 102, information indicating that the process allocation is optimized.

In contrast, if the correction evaluation value determining unit 123 determines that the correction evaluation value exceeds the predetermined threshold, the correction evaluation value determining unit 123 determines that the process allocation is not optimized. Then, the correction evaluation value determining unit 123 notifies the process allocation unit 121 of information indicating that the correction evaluation value exceeds the predetermined threshold. Accordingly, the process allocation unit 121 allocates a process to a node in new combination.

In the following, an example operation of the correction evaluation value determining unit 123 will be described assuming that the predetermined threshold is, for example, "800". If the process allocation ID illustrated in FIG. 7 is "xxx1", the correction evaluation value determining unit 123 determines that the correction evaluation value "3012" exceeds the predetermined threshold "800" and determines that the allocated process is not optimized. If the correction evaluation value determining unit 123 determines that the allocated process is not optimized because the correction evaluation value exceeds the predetermined threshold, the process allocation unit 121 allocates a process to each node in new combination and the correction evaluation value determining unit 123 re-determines whether a correction evaluation value of a process that is allocated in new combination with a node is below the predetermined threshold "800". Furthermore, if the process allocation ID illustrated in FIG. 7 is "xxx2", the correction evaluation value determining unit 123 determines that the correction evaluation value "740" is below the predetermined threshold "800" and thus determines that the allocated process is optimized. However, the predetermined threshold is not limited to "800". For example, the threshold may also be changed to any threshold.

Figure 8:
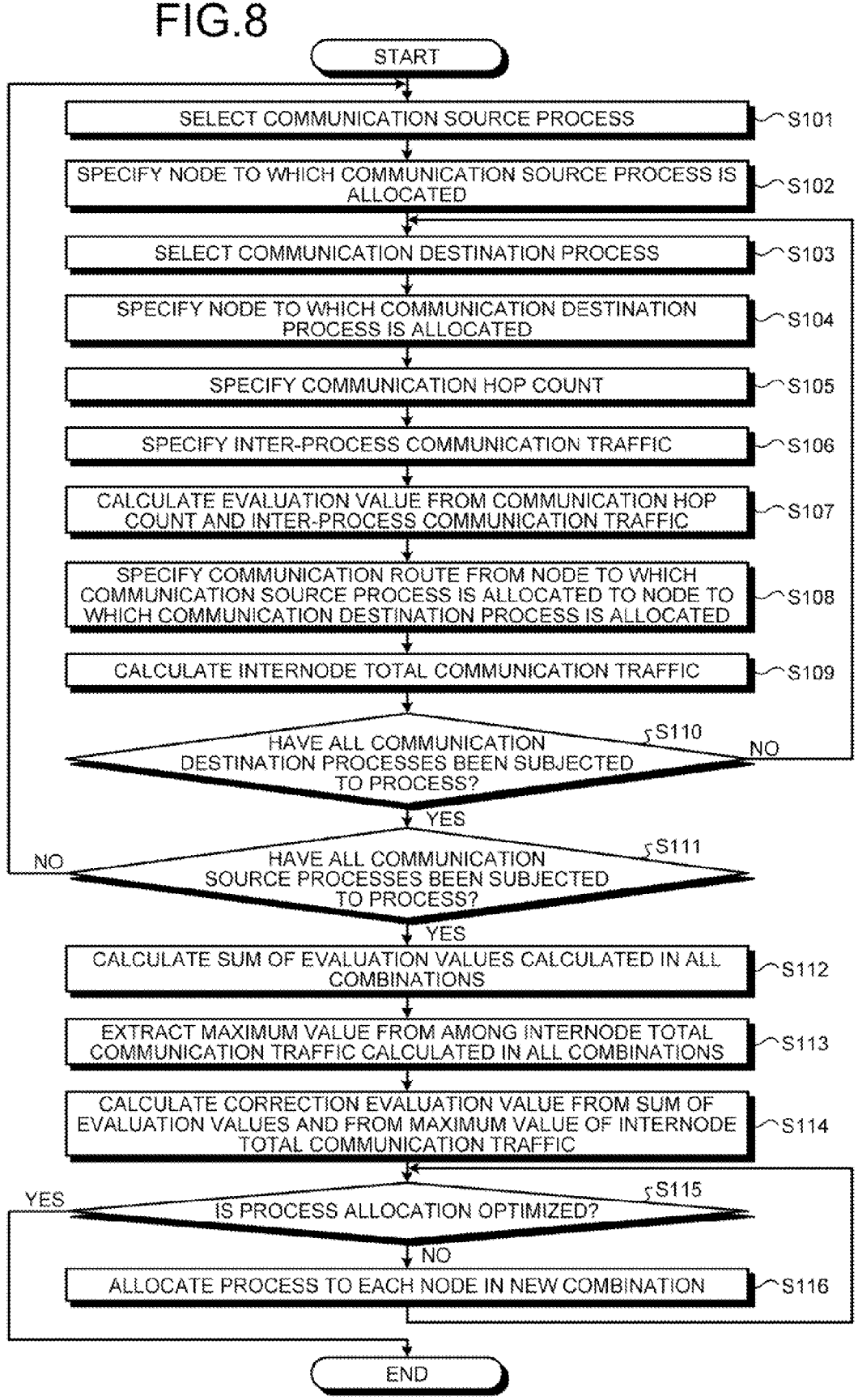
FIG. 8 is a flowchart illustrating a correction evaluation value calculating process performed by a process allocation apparatus.

Flow of a Process Performed by an Evaluation Value Calculating Apparatus According to the First Embodiment In the following, a correction evaluation value calculating process performed by the process allocation apparatus 100 according to the first embodiment will be described with reference to FIG. 8. FIG. 8 is a flowchart illustrating a correction evaluation value calculating process performed by a process allocation apparatus. As illustrated in FIG. 8, the process allocation apparatus 100 performs a process caused by the allocation of a process.

The process allocation apparatus 100 selects a communication source process (Step S101) and specifies a node to which the selected communication source process is allocated (Step S102). Furthermore, the process allocation apparatus 100 selects a communication destination process (Step S103) and specifies a node to which the selected communication destination process is allocated (Step S104).

The process allocation apparatus 100 specifies communication hop count of the communication from the node, to which the specified communication source process is allocated, to the node, to which the specified communication destination process is allocated (Step S105). Furthermore, the process allocation apparatus 100 specifies, from the inter-process communication traffic table 112, the communication traffic of the communication between the node, to which the specified communication source process is allocated, and the node, to which the communication destination process is allocated (Step S106). Then, the process allocation apparatus 100 calculates an evaluation value from the communication hop count and the inter-process communication traffic (Step S107).

The process allocation apparatus 100 specifies a communication route from the node, to which the communication source process is allocated, to the node, to which the communication destination process is allocated (Step S108) and calculates each of the internode total communication traffic between the specified nodes on the communication route (Step S109).

The process allocation apparatus 100 determines whether all of the communication destination processes have been subjected to the process (Step S110). If the process allocation apparatus 100 determines that not all of the communication destination processes have been subjected to the process (No at Step S110), the process allocation apparatus 100 returns to Step S103. In contrast, if the process allocation apparatus 100 determines that all of the communication destination processes have been subjected to the process (Yes at Step S110), the process allocation apparatus 100 determines whether all of the communication source processes have been subjected to the process (Step S111).

If the process allocation apparatus 100 determines that not all of the communication source process have been subjected to the process (No at Step S111), the process allocation apparatus 100 returns to Step S101. In contrast, if the process allocation apparatus 100 determines that all of the communication source process have been subjected to the process (Yes at Step S111), the process allocation apparatus 100 performs a process at Step S112.

Specifically, the process allocation apparatus 100 calculates the sum of the evaluation values that are calculated in all combinations (Step S112). Furthermore, the process allocation apparatus 100 extracts the maximum value from among the internode total communication traffic calculated in all combinations (Step S113). Then, the process allocation apparatus 100 calculates a correction evaluation value from the sum of the evaluation values and from the maximum value of the internode total communication traffic (Step S114). In accordance with the comparison between the correction evaluation value and the predetermined threshold, the correction evaluation value determining unit 123 determines whether the process allocation is optimized (Step S115). If the correction evaluation value determining unit 123 determines that the correction evaluation value exceeds the predetermined threshold and determines that the allocated process is not optimized (No at Step S115), the process allocation unit 121 allocates a process to each node in new combination (Step S116). The correction evaluation value determining unit 123 re-determines whether the correction evaluation value of the process that is allocated in new combination is below the predetermined threshold "800" (Step S115). If the correction evaluation value determining unit 123 determines that the correction evaluation value is below the predetermined threshold and determines that the allocated process is optimized (Yes Step S115), the process allocation apparatus 100 ends the process.

Advantage of the First Embodiment

As described above, in the first embodiment, the process allocation apparatus 100 calculates the correction evaluation value F using Equation (B) described above. To reduce the correction evaluation value, the communication hop count and the inter-process communication traffic need to be reduced and the communication is prevented from being concentrated between specific nodes. Specifically, compared with the conventional technology, the process allocation apparatus 100 can improve the evaluation of the process allocation by taking into consideration the communication traffic between nodes. Accordingly, the process allocation apparatus 100 selects the process allocation such that a process that performs a large amount of communication is less used for another communication between nodes and such that the communication hop count is reduced, thus reducing the communication processing time.

[b] Second Embodiment

The present invention can be implemented with various kinds of embodiments other than the embodiments described above. Accordingly, in a second embodiment, another embodiment included in the present invention will be described.

System Configuration, Etc.

Of the processes described in the embodiments, the whole or a part of the processes that are mentioned as being automatically performed can be manually performed, or the whole or a part of the processes that are mentioned as being manually performed can be automatically performed using known methods. Furthermore, process procedures, the control procedures, and the specific names indicated in the above specification and drawings can be arbitrarily changed unless otherwise noted.

Furthermore, it has been mentioned that the process allocation unit 121 allocates a process to a node; associates the identifier of the allocated process with the location information on a node; and stores them in the process allocation table 111; however, the configuration is not limited thereto. For example, the process allocation unit 121 may also allocates a process to a node in accordance with the process allocation that is previously set, by a user, in the process allocation table 111.

Furthermore, information to be stored in the storing unit illustrated in the drawings is only an example. The information is not always stored as illustrated in the drawings but can be arbitrarily changed. For example, the process allocation table 111 may also stores information that indicates a network of nodes is a mesh form or a torus form.

Furthermore, in accordance with various loads or the operation state, the order of the processes performed at each Step may also be changed. For example, the order of the processes performed at Steps S105 and S106 illustrated in FIG. 8 may also be switched.

The components of each device illustrated in the drawings are only for conceptually illustrating the functions thereof and are not necessarily physically configured as illustrated in the drawings. For example, in the process allocation apparatus 100, the evaluating unit 122 and the correction evaluation value determining unit 123 may be integrated. Furthermore, all or any part of the processing functions performed by each device can be implemented by a CPU and by programs analyzed and executed by the CPU or implemented as hardware by wired logic.

Program

The various processes described in the first embodiment can be implemented by a program prepared in advance and executed by a computer system such as a personal computer or a workstation. Accordingly, in the following, a computer system that executes the program having the same function as that described in the first embodiment will be described as an example.

Figure 9:
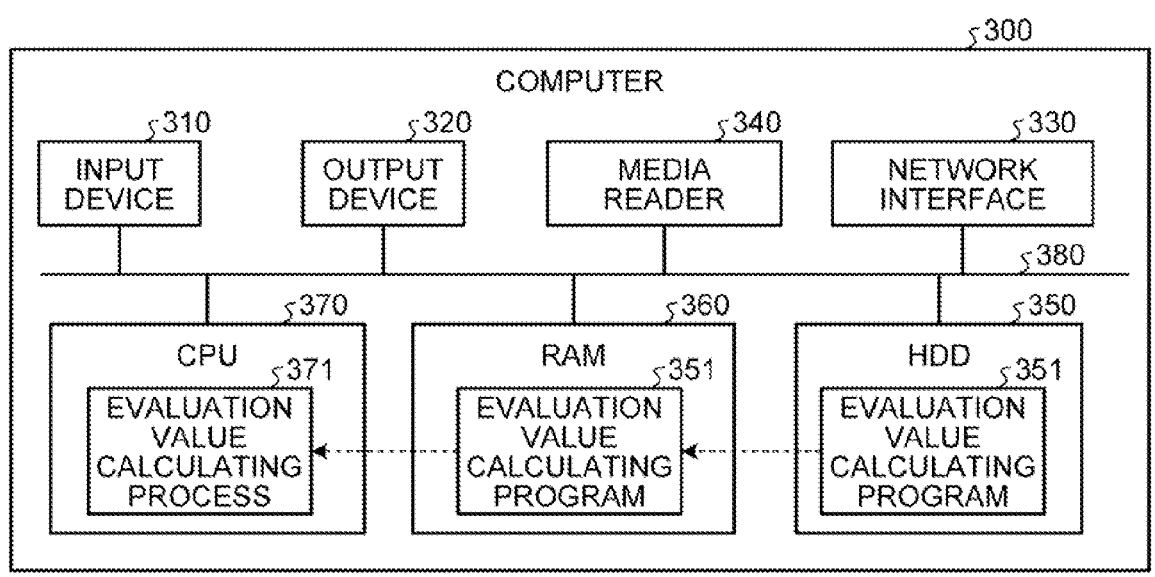
FIG. 9 is a block diagram illustrating a computer that executes an evaluation value calculating program.
Figures 10A, 10B:
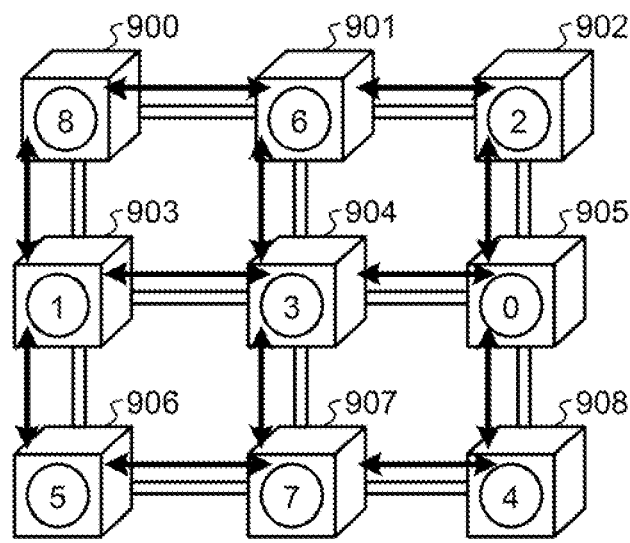
FIG. 10A is a schematic diagram illustrating a process that is used as a communication destination with respect to a communication source process.
FIG. 10B is a schematic diagram illustrating an example of a process allocation.
Figure 10C:
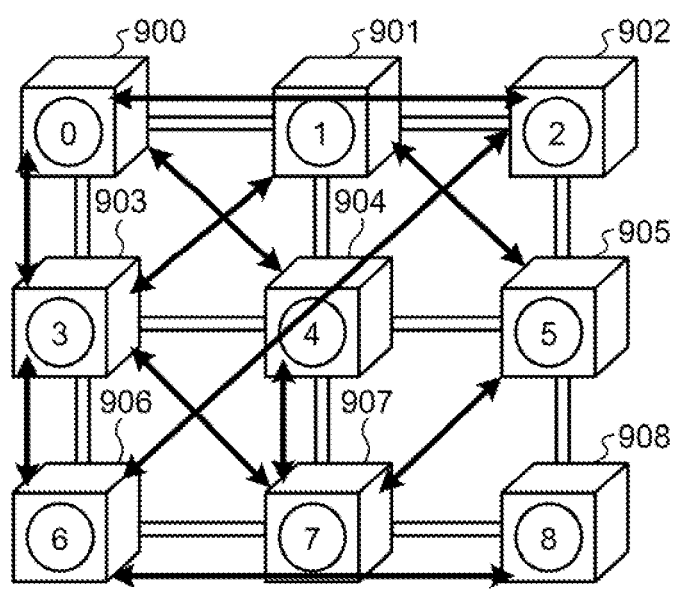
FIG. 10C is a schematic diagram illustrating another example of a process allocation.

FIG. 9 is a block diagram illustrating a computer that executes an evaluation value calculating program. As illustrated in FIG. 9, a computer 300 includes an input device 310 that receives data or various settings from a user and an output device 320 that notifies of the status of the computer or the like. Furthermore, the computer 300 also includes a network interface 330 that transmits and receives data to and from another device, a media reader 340, a hard disk drive (HDD) 350, a random access memory (RAM) 360, a CPU 370, and a bus 380. The devices 310 to 370 are connected to the bus 380.

As illustrated in FIG. 9, the HDD 350 stores therein, in advance, an evaluation value calculating program 351 having the same function as that performed by the evaluation value calculating unit 122a, the internode total communication traffic calculating unit 122b, and the correction evaluation value calculating unit 122c illustrated in FIG. 2. The media reader 340 stores therein various data that is used to implement the evaluation value calculating program 351. The various data includes, for example, the process allocation table 111 or the inter-process communication traffic table 112. The CPU 370 reads the evaluation value calculating program 351 from the HDD 350 and executes it as an evaluation value calculating process 371. Specifically, the evaluation value calculating process 371 performs the same operation as that performed by the evaluation value calculating unit 122a, the internode total communication traffic calculating unit 122b, and the correction evaluation value calculating unit 122c illustrated in FIG. 2.

The above described evaluation value calculating program 351 is not always stored in the HDD 350. For example, the evaluation value calculating program 351 may also be stored in a "portable physical medium", such as a flexible disk (FD), a CD-ROM, an MO disk, a DVD disk, a magneto-optic disk, an IC CARD, and the like, that can be inserted into the computer 300. Alternatively, the evaluation value calculating program 351 may also be stored in a "fixed physical medium", such as an HDD, that can be arranged outside the computer 300. Alternatively, the evaluation value calculating program 351 may also be stored in "another computer system" connected to the computer 300 via a public circuit, the Internet, a local area network (LAN), a wide area network (WAN), and the like. The computer 300 then reads and executes the program from the flexible disk or the like described above.

Specifically, the program can be stored in a computer-readable recording medium, such as the "portable physical medium", the "fixed physical medium", or the "communication medium" described above. Then, the computer 300 reads the program from the recording medium and executes it so as to implement the same function as that described in the embodiment. The program mentioned in this embodiment is not limited to a process performed by the computer 300. For example, the present invention can also be used in a case in which another computer system or server executes the program or executes the program in a cooperative manner.

According to an aspect of the present invention, process allocation can be accurately evaluated by taking into consideration the communication traffic between nodes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A process allocation apparatus for allocating processes to multiple nodes connected with each other, the process allocation apparatus comprising:
   a processor and a memory;

a process allocation storing unit that stores node location information on the multiple nodes and identifiers of the processes allocated to the multiple nodes;

an inter-process communication traffic storing unit that stores an identifier of a process used as a communication source, an identifier of a process used as a communication destination, and inter-process communication traffic that indicates communication traffic between the process used as the communication source and the process used as the communication destination;

an evaluation value calculating unit that specifies a hop count from a communication source node to which the process used as the communication source is allocated to a communication destination node to which the process used as the communication destination is allocated from the process allocation storing unit, acquires the inter-process communication traffic from the inter-process communication traffic storing unit, and calculates an evaluation value of process allocation by multiplying the hop count and the inter-process communication traffic;

an internode total communication traffic calculating unit that specifies a communication route from the communication source node to the communication destination node, acquires inter-process communication traffic between processes allocated to nodes on the specified communication route from the inter-process communication traffic storing unit, and calculates internode total communication traffic that indicates a sum of the communication traffic between the nodes from the acquired inter-process communication traffic;

a correction evaluation value calculating unit that calculates a sum of the evaluation values of the multiple nodes, extracts the maximum value of the internode total communication traffic among the nodes, and calculates a correction evaluation value by multiplying the calculated sum of the evaluation values and the extracted maximum value of the internode total communication traffic; and a process allocation unit that relocates the allocated processes among the multiple nodes when the calculated correction evaluation value is above a predetermined value.

2. A process allocation method for allocating processes to multiple nodes connected with each other, the process allocation method comprising:

specifying a hop count from a communication source node to which a process used as a communication source is allocated to a communication destination node to which a process that is used as a communication destination is allocated from a process allocation storing unit that stores node location information on the multiple nodes and identifiers of the processes allocated to the multiple nodes;

acquiring an identifier of the process used as the communication source, an identifier of the process used as the communication destination, and inter-process communication traffic that indicates communication traffic between the process used as the communication source and the process used as the communication destination, wherein the inter-process communication traffic from the communication source node to the communication destination node is stored in an inter-process communication traffic storing unit;

calculating an evaluation value of process allocation by multiplying the hop count and the inter-process communication traffic;

specifying a communication route from the communication source node to the communication destination node;

acquiring inter-process communication traffic between processes allocated to nodes on the specified communication route from the inter-process communication traffic storing unit;

calculating internode total communication traffic that indicates a sum of the communication traffic between adjacent nodes from the acquired inter-process communication traffic;

calculating a sum of the evaluation values of the multiple nodes;

extracting the maximum value of the internode total communication traffic among the nodes;

calculating a correction evaluation value by multiplying the calculated sum of the evaluation values and the extracted maximum value of the internode total communication traffic; and relocating the allocated processes among the multiple nodes when the calculated correction evaluation value is above a predetermined value.

3. A non-transitory computer readable storage medium having stored therein a process allocation program for directing a computer to perform an object process of allocating processes to multiple nodes connected with each other, the object process comprising:

specifying a hop count from a communication source node to which a process used as a communication source is allocated to a communication destination node to which a process that is used as a communication destination is allocated from a process allocation storing unit that stores node location information on the multiple nodes and identifiers of the processes allocated to the multiple nodes;

acquiring an identifier of the process used as the communication source, an identifier of the process used as the communication destination, and inter-process communication traffic that indicates communication traffic between the process used as the communication source and the process used as the communication destination, wherein the inter-process communication traffic from the communication source node to the communication destination node is stored in an inter-process communication traffic storing unit;

calculating an evaluation value of process allocation by multiplying the hop count and the inter-process communication traffic;

specifying a communication route from the communication source node to the communication destination node;

acquiring inter-process communication traffic between processes allocated to nodes on the specified communication route from the inter-process communication traffic storing unit;

calculating internode total communication traffic that indicates a sum of the communication traffic between adjacent nodes from the acquired inter-process communication traffic;

calculating a sum of the evaluation values of the multiple nodes;

extracting the maximum value of the internode total communication traffic among the nodes;

calculating a correction evaluation value by multiplying the calculated sum of the evaluation values and the extracted maximum value of the internode total communication traffic; and relocating the allocated processes among the multiple nodes when the calculated correction evaluation value is above a predetermined value.

* * * * *